United States Patent
Szabó et al.

(10) Patent No.: US 12,546,713 B2
(45) Date of Patent: Feb. 10, 2026

(54) NITROUS OXIDE SENSOR

(71) Applicant: Medclair AB, Stockholm (SE)

(72) Inventors: István Szabó, Boda Kyrkby (SE);
Jerker Sundling, Borlänge (SE);
Tomas Nyberg, Uppsala (SE)

(73) Assignee: Medclair Sweden AB, Stockholm (SE)

( * ) Notice: Subject to any disclaimer, the term of this patent is extended or adjusted under 35 U.S.C. 154(b) by 231 days.

(21) Appl. No.: 18/282,458

(22) PCT Filed: Mar. 16, 2022

(86) PCT No.: PCT/EP2022/056842
§ 371 (c)(1),
(2) Date: Sep. 15, 2023

(87) PCT Pub. No.: WO2022/194942
PCT Pub. Date: Sep. 22, 2022

(65) Prior Publication Data
US 2024/0159664 A1 May 16, 2024

(30) Foreign Application Priority Data
Mar. 17, 2021 (SE) .................................. 2150303-2

(51) Int. Cl.
*G01N 21/3518* (2014.01)
*G01N 21/37* (2006.01)
*G08B 21/12* (2006.01)

(52) U.S. Cl.
CPC ......... *G01N 21/3518* (2013.01); *G08B 21/12* (2013.01); *G01N 2021/3527* (2013.01);
(Continued)

(58) Field of Classification Search
CPC ........... G01N 21/3518; G01N 21/3504; G01N 2201/0235; G01N 2201/0245
See application file for complete search history.

(56) References Cited

U.S. PATENT DOCUMENTS

| 5,091,649 A | 2/1992 | Rantala |
| 5,886,348 A | 3/1999 | Lessure et al. |

(Continued)

FOREIGN PATENT DOCUMENTS

| JP | H9-33406 A | 2/1997 |
| JP | 2001-208685 A | 8/2001 |

(Continued)

OTHER PUBLICATIONS

M. Gomes Da Silva et al., "Photoacoustic Measurement of N2O Concentrations in Ambient Air with a Pulsed Optical Parametric Oscillator." Applied Physics B, Lasers and Optics, vol. 82, No. 2, pp. 329-336, 2006.

*Primary Examiner* — Casey Bryant
(74) *Attorney, Agent, or Firm* — Blank Rome LLP

(57) ABSTRACT

The present invention relates to a gas sensor (100) comprising a measurement chamber (102) for measuring presence of a first gas, the first gas being nitrous oxide ($N_2O$) and an optical source (103) for emitting radiation in the measurement chamber (102). The sensor also comprises a radiation detector (104) sensitive to radiation emitted by the optical source (103), the radiation being detected by the radiation detector (104) following passage through the measurement chamber (102). A diffusion layer (131) is configured to allow diffusion of ambient gas into and out from the measurement chamber (102), and the diffusion layer (131) comprises means (133) for preventing diffusion of carbon dioxide ($CO_2$) in the ambient gas into the measurement chamber (102). The invention also relates a nitrous oxide detector comprising such a gas sensor, and a method for determining presence of nitrous oxide in the ambience.

13 Claims, 5 Drawing Sheets

(52) U.S. Cl.
CPC ..... *G01N 21/37* (2013.01); *G01N 2201/0235* (2013.01); *G01N 2201/0245* (2013.01)

(56) References Cited

U.S. PATENT DOCUMENTS

| | | | | |
|---|---|---|---|---|
| 6,002,133 | A | * 12/1999 | Nelson | G01N 21/3504 |
| | | | | 250/343 |
| 6,469,303 | B1 | * 10/2002 | Sun | G01N 21/3504 |
| | | | | 250/338.3 |
| 2008/0231857 | A1 | 9/2008 | Depeursinge et al. | |
| 2012/0000549 | A1 | 1/2012 | Thorne et al. | |
| 2018/0095030 | A1 | 4/2018 | Tadanaga et al. | |
| 2020/0400556 | A1 | 12/2020 | Lützelschwab et al. | |

FOREIGN PATENT DOCUMENTS

| | | | | |
|---|---|---|---|---|
| JP | 2009-46335 | A | 3/2009 | |
| WO | 91/03204 | A1 | 3/1991 | |
| WO | WO-0186260 | A1 * | 11/2001 | ............. G08B 21/12 |

\* cited by examiner

NITROUS OXIDE SENSOR

FIELD OF THE INVENTION

The present invention relates to gas sensors, and in particular to gas sensors that detect the presence of a specific gas by monitoring the absorption of optical radiation transmitted through a chamber containing a sample of the gas being measured.

BACKGROUND OF THE INVENTION

Nitrous oxide, commonly known as laughing gas or nitrous, i.e. the chemical compound having the formula $N_2O$, is commonly used in medicine. In particular, nitrous oxide $N_2O$ is widely used in dentistry and obstetric care as an anaesthetic.

The use of nitrous oxide is a well-established method for reducing pain with little risk for the person using the nitrous oxide to reduce pain. However, it is not healthy to be constantly subjected to nitrous oxide $N_2O$. In particular medical personnel, such as personnel being present in delivery rooms for extended periods of time as part of their daily work, suffer the risk of being excessively exposed to this gas. Measures are therefore regularly being taken to ensure efficient evacuation of gas that has been delivered to patient. For example, breathing mask systems may be utilized, which may be connected to a central ventilation system to properly evacuate the gas from the location of use. Leakage may still occur, however, and for this reason nitrous oxide sensors may be utilized to measure the current level of undesired gas that the staff is subjected to.

There exist various kinds of gas sensors for measuring presence of gas that may be utilized in this regard. For example, stationary detectors may be installed in the room to measure the current concentration in the room. This, however, may not always be the case and there may also be higher concentrations e.g. closer to the patient being administered the nitrous oxide.

There exist, in this regard, a type of portable gas sensors which rely on a principle that monitors the absorption of optical radiation that is transmitted through a chamber containing the gas to be tested, where the presence of the gas being measured will depend on the extent to which the optical radiation is absorbed by the gas.

Such gas sensors may utilise e.g. an infra-red source of optical radiation, and a corresponding infra-red radiation detector for detecting the emitted infra-red radiation. Sensors of this kind may be utilised in various applications, and, for example, be utilised in the detection of nitrous oxide.

The levels of nitrous oxide in the area where the staff is working may, however, be small and sensors of this kind may not provide sufficient accuracy in the determination of the occurrence of nitrous oxide.

SUMMARY OF THE INVENTION

An object of the disclosure is to provide a sensor that is capable of accurately sensing the occurrence of nitrous oxide utilizing a sensor relying on the diffusion principle to thereby allow portability and where the sensor also provides a high accuracy also when the occurrence of nitrous oxide is low.

This and other objects are achieved by means of a gas sensor comprising:
a measurement chamber for receiving ambient gas, such as air surrounding the gas sensor, to be measured;
an optical source for emitting radiation in the measurement chamber;
a radiation detector sensitive to radiation emitted by the optical source, the radiation being configured to be detected by the radiation detector following passage through the measurement chamber, and
the radiation detector being configured to measure occurrence of nitrous oxide $N_2O$ in the gas being measured.

The gas sensor further comprises a diffusion layer, the diffusion layer being configured to allow diffusion of ambient gas into and out from the measurement chamber, and the diffusion layer comprising means for preventing diffusion of carbon dioxide $CO_2$ in the ambient gas into the measurement chamber.

As was discussed above, it is common to use nitrous oxide as an anaesthetic drug in medical care and dental care. For example, it is common to use nitrous oxide as an anaesthetic drug childbirth.

The use of nitrous oxide, being a gas, often results in gas leakages. Such leakage may origin e.g. from malfunctioning equipment but also from improper use of the inhalation mask that is used to administer the nitrous oxide. Leakages of this kind cause an elevation of nitrous oxide gas concentrations in the air of the room, and may pose a health hazard for both personnel and patients in the delivery rooms where both personnel and patients may be present for extended periods of time. The concentrations of nitrous oxide may be relatively small, such as in the order of 1-100 ppm, but over time also low concentrations may pose a health hazard. The concentration may also be higher closer to the patient where the medical personnel oftentimes reside. Delivery rooms may comprise stationary detectors for detecting presence of nitrous oxide, but the personnel may spend a working day in various different locations, and also considerably closer to the patient, and hence the administration of nitrous oxide, than is the stationary detector. Measurements from such detectors may therefore not provide sufficiently representative measurements.

Portable gas detectors may therefore be utilised in this regard, but prior art sensors are not capable of accurately detecting concentrations in the order of 0-100 ppm, which, as stated, still may prove hazardous over time. The reason for this is that the sensors of the gas detectors are cross-sensitive to carbon dioxide $CO_2$. This cross-sensitiveness can be alleviated in stationary sensors through the use of a forced flow through the sensor, but this technology would render portable gas detectors bulky where instead a diffusion technology is utilised to fulfil space, weight and power requirements. This flaw of portable gas detectors is therefore forced to be accepted.

Diffusion means that the sensor has an inlet to allow gas to enter the measurement chamber trough natural diffusion, i.e. without mechanical pumping of gas through the chamber being required. The gas also leaves the measurement chamber through the same one or more openings that also form inlets for allowing passage of the gas into the measurement chamber.

According to embodiments of the invention, however, it is provided a gas sensor of the diffusion kind that is capable of providing nitrous oxide measurements that are accurate also for very low concentration in the ambient gas, e.g. air surrounding the sensor. Since the sensor is of the diffusion kind this allows for use of a portable gas detector that is accurate also for very low concentrations. This is accomplished in particular through the use of a diffusion layer through which the ambient gas enters and exits the measurement chamber of the sensor through diffusion, i.e. the net movement of gas molecules from a region of higher concentration to a region of lower concentration, the regions herein being the measurement chamber and the surroundings of the sensor. The diffusion layer is of a kind being such that while the diffusion layer provides a path for diffusion of ambient gas into and out from the measurement chamber, diffusion layer simultaneously is provided with means for preventing diffusion of carbon dioxide $CO_2$ through the diffusion layer while still other molecules such as nitrous oxide freely may enter and leave the measurement chamber through the diffusion layer. This has the advantage that the occurrence of carbon dioxide $CO_2$ in the measurement chamber, for which the radiation detector is cross-sensitive, is substantially reduced or eliminated so that the accuracy of the measurement of nitrous oxide $N_2O$ provided by the sensor can be substantially improved. This may be utilised further in a nitrous oxide detector according to the below.

With regard to the blocking of carbon dioxide $CO_2$ in the diffusion layer, this may, for example, be carried out by the diffusion layer comprising absorbing means, such as one or more absorbents, that selectively absorbs carbon dioxide $CO_2$ from the gas passing through the diffusion layer during the passage to the measurement chamber of the sensor. Since the carbon dioxide is absorbed, it is prevented from entering the measurement chamber.

With regard to the diffusion, it will take some time for a change in concentration of nitrous oxide in the ambient gas to be reflected by the sensor measurements. That is, the required diffusion between measurement chamber and ambient gas will take some time to level the concentrations to a similar concentration. This diffusion time will depend on the "resistance" against diffusion that the diffusion layer exhibits, and the diffusion layer may therefore be designed to allow a diffusion rate of nitrous oxide being such that the concentration of nitrous oxide in the measurement chamber reflects a change in concentration of nitrous oxide in the ambient gas within a first predetermined period of time, such as any period of time in the interval of 1-120 s. It is in general the case that too long diffusion times are not desired, since this means a corresponding delay in detecting increasing nitrous oxide levels.

According to embodiments of the invention, the diffusion layer is designed such that a diffusion rate through the diffusion layer is dependent on the thickness of the diffusion layer, and the thickness may thereby be selected to a thickness that fulfils predetermined requirements regarding diffusion time.

According to embodiments of the invention the diffusion layer comprises a filter, where the resistance against diffusion depends on the filter thickness.

According to embodiments of the invention, the filter comprises one or more absorbents such as sodium hydroxide and/or calcium hydroxide, e.g. in the form of granules, for absorbing carbon dioxide from the gas passing through the measurement chamber. The diffusion time may then depend on the number of layers of granules, and e.g. a single, or two or three layers may used, e.g. being dependent on the size of the granules. As an example, a layer of granules may be 2-5 mm thick.

The diffusion layer may be of a kind that requires replacement when a predetermined time of use has lapsed. For example, the at least one absorbent may be consumed by the absorbing of carbon dioxide and thereby require regular replacement to provide accurate measurements. The diffusion layer may comprise an indicator for indicating a need for replacement of the diffusion layer. This may be accomplished e.g. by absorbents changing colour while being saturated by absorbing carbon dioxide.

The lifetime of the filter may be prolonged by increasing the thickness of the filter, i.e. the time interval between replacements of the filter may be prolonged by increasing the thickness of the filter for an otherwise same filter area. As discussed above, the diffusion time may need to be taken into account when suitably determining the thickness of the filter.

The gas sensor may further comprise processing means for processing signals from the detector to generate a representation of a presence of nitrous oxide and output the measurement on an output.

The processing means may also be configured to compensate the measurement result e.g. for temperature, humidity, and/or pressure, where the gas sensor may comprise appropriate sensors to allow such compensation.

Furthermore, the gas sensor may comprise receiving means for releasably receiving corresponding means of the diffusion layer, or vice versa, to thereby allow releasable attachment of the diffusion layer to the sensor body of the gas sensor. This provides for swift replacement of the diffusion layer, such as filter, when this is required to secure proper measurement results.

The receiving means and corresponding means may comprise any suitable means for allowing e.g. a bayonet connection of the diffusion layer to the sensor housing, and/or a snap-on attachment of the diffusion layer to the gas sensor.

The optical source and the radiation detector may be arranged in various manners in relation to each other in the measurement chamber. In particular, the measurement chamber may be designed such that the optical pathway between the optical source and the radiation detector is configured to exceed the possible optical pathway between the optical source and the radiation detector when the optical source and the radiation detector are arranged within direct line of sight of each other within the measurement chamber. This further allows reduction of the size of the gas sensor and thereby nitrous oxide detector since the measurement chamber may be further reduced in size while still providing a minimum desired optical pathway.

According to embodiments of the invention it is provided a nitrous oxide detector comprising a gas sensor according to the above. This allows for a portable nitrous oxide detector while simultaneously providing accurate measurements. In particular this allows the detector to be designed to be carried by medical staff throughout the workday while carrying out regular work, so that the detector can measure exposure throughout the workday. The nitrous oxide detector further comprises processing means for receiving measurements of the occurrence of nitrous oxide from the gas sensor. The processing means are also configured to generate a signal when the measurements of the occurrence of nitrous oxide exceed a predetermined threshold.

The processing means may thereby monitor the occurrence of nitrous oxide over time, and generate a signal such as an alarm signal in case the monitored measurements exceed some predetermined limit.

According to embodiments of the invention, processing means of the nitrous oxide detector are configured to accumulate a presence of nitrous oxide over time, and generate signal when an accumulated occurrence of nitrous oxide exceeds the predetermined threshold during a predetermined period of time.

In this way e.g. small concentrations can be accumulated over time, and an alarm signal be generated in case the accumulated period of time of a concentration at least being some predetermined concentration exceeds a time limit. This allows that also small concentrations that may be hazardous if being subjected to for longer periods of time can be detected and appropriately accounted for to avoid hazardous exposure. Since the nitrous gas detector is portable varying concentrations at various locations are also accounted for when the detector is carried by a user.

The gas detector may be configured to accumulate various different accumulations for different levels of occurrences, and generate a signal if any of the various accumulations reaches a threshold. For example, the detector may be configured to accumulate the presence of concentrations exceeding 100 ppm for an 8 hour work day. The detector may also be configured to accumulate e.g. short term values to determine whether the concentration exceeds 500 ppm during a 15 minute interval in which case an alarm signal may be generated.

The detector may be configured to generate an alarm e.g. in case any particular concentration is exceeded for any particular predetermined period of time. Examples of such situations may include four hours exceeding 100 ppm, 15 minutes exceeding 500 ppm.

The long term accumulations may also e.g. comprise detected concentrations in one or more of the concentrations: 20-25 ppm, 25-50 ppm, 50-100 ppm, 100-200 ppm.

The short term accumulations e.g. may comprise detected concentrations in one or more of the concentrations: 200-300 ppm, 300-400 ppm, 500-600 ppm, 600-1000 ppm.

It is to be understood that any other limits regarding concentration intervals and time periods are contemplated, and such limits may be adapted to prevailing regulations at the location of use of the nitrous oxide detector.

As was discussed above, the diffusion layer may need regular replacement, e.g. by comprising at least one absorbent being consumed by absorbing carbon dioxide $CO_2$. The nitrous oxide detector may therefore comprise means, such as the processing means, for determining a time of operation of the nitrous oxide detector that has lapsed following a replacement of the diffusion layer, and a signal representing a requirement for replacing the diffusion layer may be generated when a predetermined time limit is exceeded to alert a user of the need for replacement of the diffusion layer. The nitrous oxide detector may also comprise means for receiving an acknowledgement from the user that the layer has been properly replaced.

Also, according to embodiments of the invention, the nitrous oxide detector is provided with means for attachment of the diffusion layer according to the above in place of the sensor body.

Further characteristics of the present invention and advantages thereof are indicated in the detailed description of exemplary embodiments set out below and the attached drawings.

DETAILED DESCRIPTION OF EXEMPLARY EMBODIMENTS

Embodiments of the present disclosure will be exemplified in the following in view of a particular kind of nitrous oxide sensor. It is to be understood that the invention is equally applicable for any kind of sensor technology for as long as the gas to be measured enters a measuring chamber through diffusion and not a forced flow being pumped through the sensor.

Figure 1:
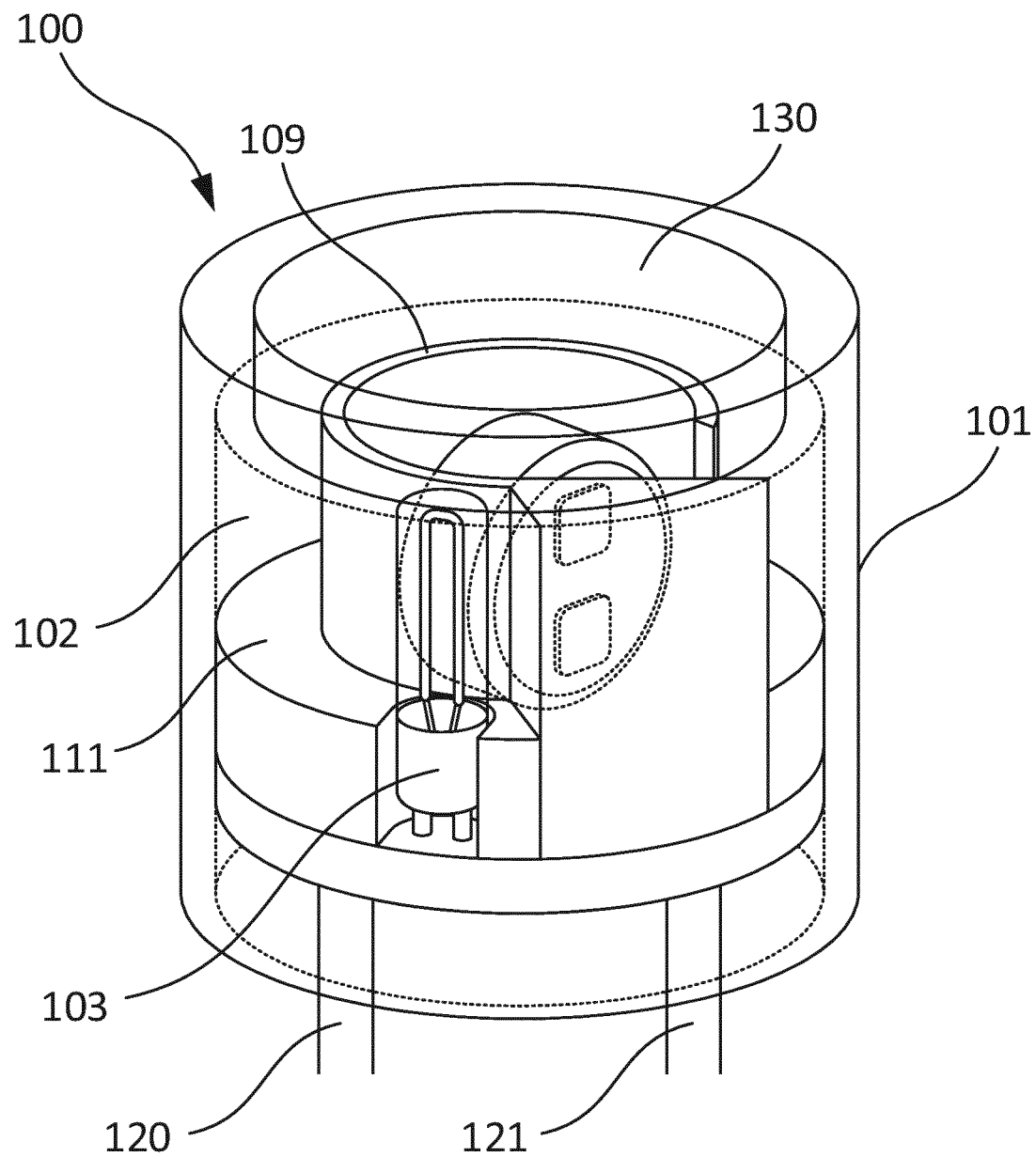
FIG. 1 illustrates a perspective view an exemplary nitrous oxide sensor according to embodiments of the invention.
Figure 2:
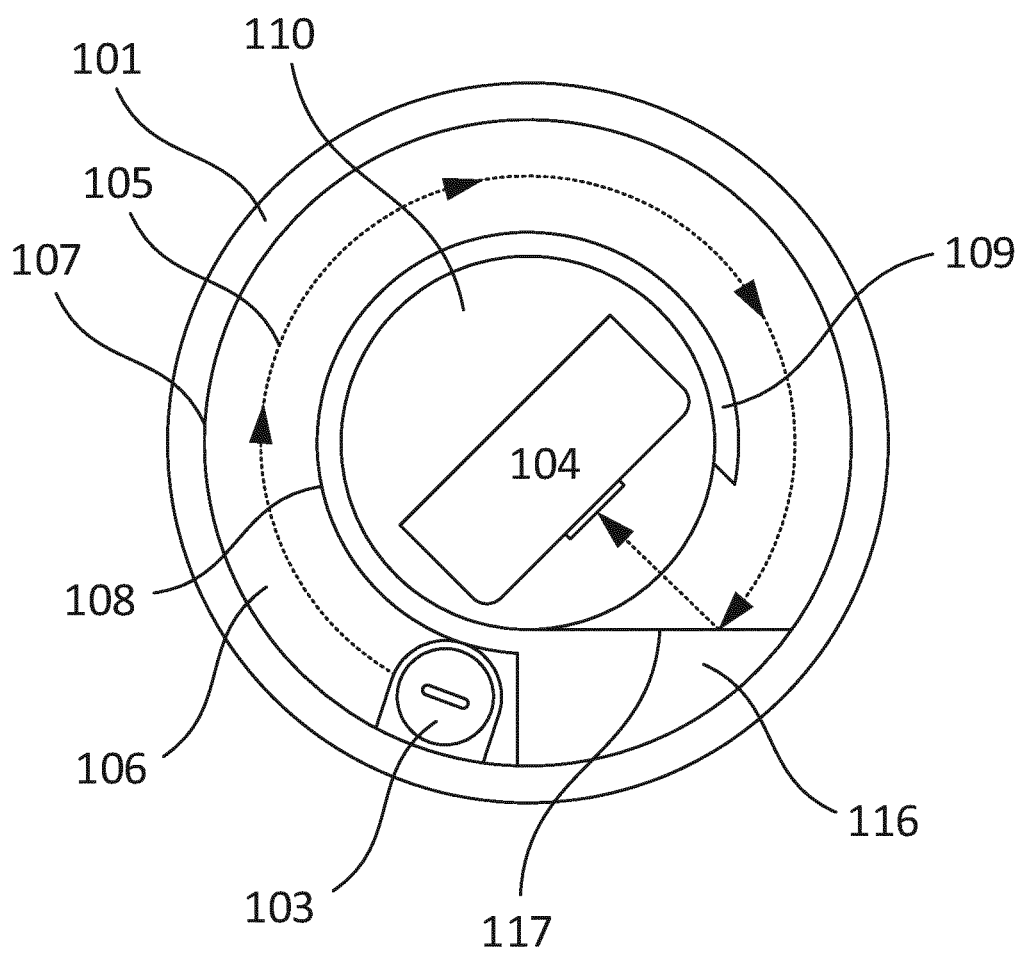
FIG. 2 illustrates the nitrous oxide sensor of FIG. 1 as seen from above.
Figure 3:
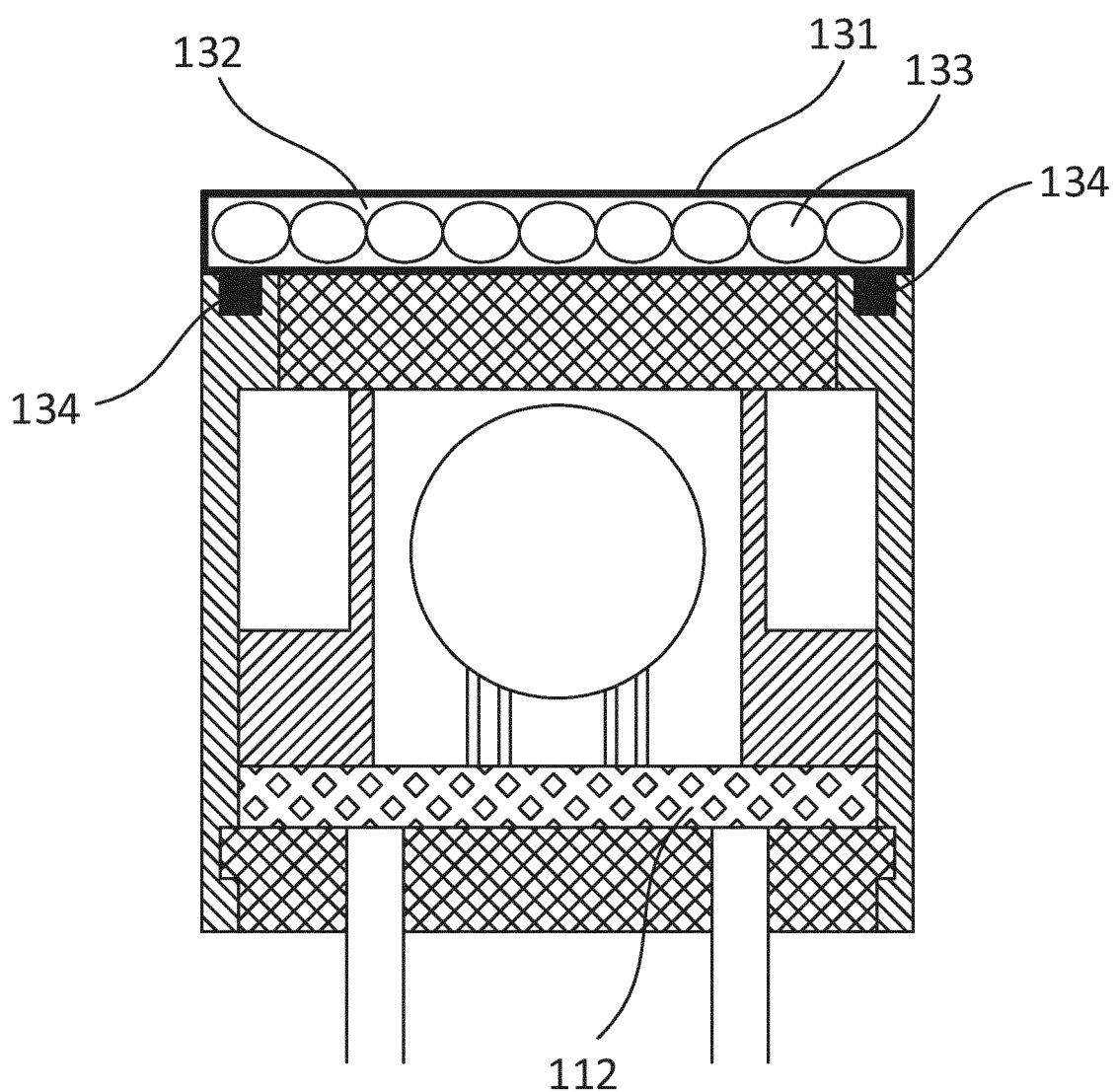
FIG. 3 illustrates a section of the nitrous oxide sensor of FIG. 1 including a diffusion layer according to embodiments of the invention.

An exemplary sensor according to the invention is illustrated in FIGS. 1-3. Expressions relating to relative positions such as "top", "bottom", are for illustration purposes only. In use the sensor may have any orientation, and is in particular intended for use in a portable nitrous oxide gas detector as described below which may be carried in essentially any direction.

In FIG. 1 the gas sensor is generally denoted by 100, and comprises a housing 101 enclosing a measurement chamber 102. An optical source 103 for emitting radiation in the optical spectrum is arranged in the measurement chamber 102. According to the present example, the optical source 103 is an optical source for emitting infra-red radiation. It is to be noted, however, that the optical source may be configured to radiate any suitable part of the infra-red, visible, ultra-violet ranges of the electromagnetic spectrum that are included in optics and may be utilised for detection of nitrous oxide by absorbed by the nitrous oxide. The radiation emitted by the optical source (transmitter) 103 is detected by a radiation detector 104. The optical source 103 and radiation detector 104 may be arranged in various manners in relation to each other in the measurement chamber 102. For example, the optical source 103 and radiation detector 104 may be arranged diametrically opposite each other of the, according to the present example, cylinder-shaped measurement chamber, or according to any other suitable configuration. Given the dimensions of the optical source and radiation detector it may be desirable to prolong the optical pathway. According to the present example, therefore, the optical source 103 and radiation detector 104 are arranged in a manner that further prolongs the optical pathway between optical source 103 and radiation detector 104 to thereby subject the emitted radiation to larger amounts of gas which may improve measurement accuracy. According to the present example, this is accomplished by utilising the circumference of the measurement chamber 102.

This is illustrated in FIG. 2 where the optical pathway 105 is delimited by a circumferential chamber 106 formed by the inner surface 107 of the housing 101, where the inner surface 107 may consist of or be provided with a reflective coating to reflect the optical radiation along the circumferential pathway 105. The circumferential chamber 106 is further defined by an external surface 108 of an inner cylindrical wall 109 enclosing a central chamber 110 in which the radiation detector 104 is arranged. The optical pathway 105 is also delimited by a bottom surface 111, which may also consist of or be provided with a reflective coating/layer. The central chamber 110 comprising the radiation detector 104 is defined by an internal surface of the housing base 112 (FIG. 3) and an internal surface 113 of the inner cylindrical wall 109 of the sensor housing 101. The housing base 112 provides a planar reflective surface, in the central chamber 110. In order to facilitate reflection of radiation from the circumferential chamber 106 to the radiation detector 104, a deflector element 116 with a reflecting surface 117 deflects radiation towards the radiation detector 104.

In this way, an optical pathway 105 exceeding the general inner diameter of the measurement chamber 102 is obtained. According to embodiments of the invention, other arrangements may be utilised to prolong the optical pathway 105. However, as discussed, it is also contemplated that the optical source 103 and radiation detector 104 are arranged in a direct line of sight with respect to each other.

The radiation detector 104 may be of any suitable kind that is capable of detecting variations in the intensity of the radiation emitted by the optical source 103 and received by the radiation detector 104. With regard to e.g. nitrous oxide, this molecule absorbs infra-red radiation, and according to embodiments of the invention the optical source radiates infra-red radiation. The radiation detector detecting the infra-red radiation may then consist of a pyroelectric radiation detector, e.g. of a dual detection element type.

The infra-red radiation emitted by the source is radiated onto the detector, following passage through the measurement chamber containing the gas under test, where some of the infra-red radiation will be absorbed by the nitrous oxide along the optical pathway. The absorption is dependent on the wavelength of the infra-red radiation, and the presence of nitrous oxide may be determined by suitably selecting the wavelengths being detected by the radiation detector. This may e.g. be carried out through the use of a band-pass filter to filter the radiation received by the radiation detector in a manner known per se.

The radiation detector 104 may further be arranged to output a signal, such as a voltage or current or digital signal reflecting the level of the detected radiation. The measurement signal is output through connection means 120, 121. The connection means 120, 121 may also be utilised to power the sensor.

The nitrous oxide sensor 100 is further of a diffusion type, that is, the gas being measured enters and exits the sensor through diffusion. The gas enters and exits the sensor through the top 130 of the sensor 100. According to embodiments of the invention, the top of the sensor housing comprises a diffusion layer 131 to allow controlled diffusion of gas under test from the ambience of the sensor to the measurement chamber 102 and thereby circumferential chamber 106/optical pathway 105. In dependence of the current concentration of nitrous oxide in the surroundings in which the sensor is present, varying portions of the emitted infra-red radiation will be absorbed by nitrous oxide molecules that has entered the measurement chamber 102 through diffusion, and where a higher presence of nitrous oxide in the measurement chamber will result in higher levels of infra-red radiation being absorbed. This is reflected in the sensor signals delivered by the radiation detector. Sensors of this kind, and also radiation detectors, are well described in the art and is therefore not described more in detail herein. The sensor may also comprise additional internal circuitry e.g. in order to allow calibration of the sensor where such calibration is also well described in the art. The nitrous oxide sensor may also comprise temperature, pressure and/or humidity sensors to properly compensate measurement results for changes in such environmental conditions.

However, according to the prior art sensors relying on diffusion in regard of the gas measured entering and exiting the measurement chamber, the accuracy, or sensitivity, may be undesirably low for low occurrences of nitrous oxide. This is, as was discussed above, a result of the fact that air contains carbon dioxide and sensors being sensitive to the occurrence of nitrous oxide are oftentimes cross-sensitive to carbon dioxide. The occurrence of carbon dioxide may therefore render measurements unreliable, or in particular have the result that the sensor is only sensitive to occurrences of nitrogen oxide exceeding some minimum level. However, also exposure to low occurrences of nitrous oxide for longer period of time may subject medical staff to potential health hazards over time, and there also exist regulations in various jurisdictions restricting allowable exposure in this regard. This may render it necessary to use larger stationary sensor devices comprising a forced, i.e. pump, flow of the gas to be measured.

According to the invention, it is provided a sensor that allows accurate measurements also in regard of very low occurrences of nitrous oxide, such as occurrences in the order of 0 to 100 ppm. This is accomplished through the use of a diffusion layer 131, that, while it allows nitrous oxide molecules to enter and exit the measurement chamber through diffusion, simultaneously prevents carbon dioxide from entering the measurement chamber so that the sensor thereby will carry out measurements on a gas for which the occurrence of carbon dioxide has been substantially reduced or eliminated altogether.

According to the present example, this is accomplished through the use of a carbon dioxide blocking diffusion layer 131 in the form a filter that covers the top of the sensor housing. According to the present example, the filter is in the form of a container 132 that comprises granules 133 of a carbon dioxide absorbing substance, such as, for example sodium hydroxide or calcium hydroxide. With regard to these two substances, for example, carbon dioxide, when coming into contact with the granules of the filter, will react with the granules of the filter to form other molecules that will not continue into the measurement chamber 102 and/or will not impact sensor measurements.

In this way, the gas that actually enters the measurement chamber 102 will be freed from carbon dioxide to a large extent such that measurements are essentially performed on the nitrous oxide. This also means that the sensor will be sensitive also to very low occurrences of nitrous oxides in the ambience of the sensor with high accuracy. As will be described below this can be used to detect an accumulated occurrence over time to reveal whether e.g. allowable exposure is exceeded also in situations when this may not otherwise be detectable during use of portable nitrous oxide detectors.

With regard to the diffusion filter this may be arranged to be relatively thin and e.g. comprise only a few or a single layer of the granules. This is because the thicker the layer is, the longer it will take for that diffusion to reach a state where the concentration of nitrous oxide in the measurement chamber is the same as the concentration on the outer side of the filter. Still, it is oftentimes the average value over time that matters, so the relative disadvantage of a delay in the sensor sensing an actual change in concentration in the environment in which the sensor is present is well exceeded by the advantage of providing accurate measurements also for low concentrations. In case a larger hysteresis is allowed, i.e. longer period of time may lapse before the actual occurrence in the ambient air is reflected in the measurement results, a thicker filter may be utilised.

For example, if the filter renders the diffusion to take e.g. a minute to reflect the change in a change in concentration this means that the sensor values essentially represents the ambient air from a minute ago.

Filters in general, and filters of the disclosed kind in particular, may need replacement in order to provide continued accurate measurements. According to the present example the carbon dioxide in the gas entering the sensor is reduced through a chemical reaction where the active substance simultaneously forms part of the chemical reaction. The presence of the active substance thereby decreases over time with a corresponding reduction over time in the capacity to absorb carbon dioxide. If the filter is not properly absorbing carbon dioxide the carbon dioxide will instead pass through the filter and compromise the measurements such that inaccurate results are obtained. The filter 131 is therefore releasably attached to the sensor body so as to allow replacement of the filter when needed. This may be relatively often, such as every 8 hours, every 16 hours, every 24 hours or any other time interval in dependence of the particular carbon dioxide reducing layer being used.

The filter is therefore provided with attachment means 134 that engage with corresponding means in the sensor body for receiving the attachment means of the filter to firmly hold the filter in place. Alternatively or in addition, such attachment means and receiving means may instead be arranged to attach the filter by being attached to a nitrous oxide detector comprising a sensor of the disclosed kind. The attachment means and receiving means may constitute any suitable means, such as a bayonet coupling or snap-on attachment.

Figure 4:
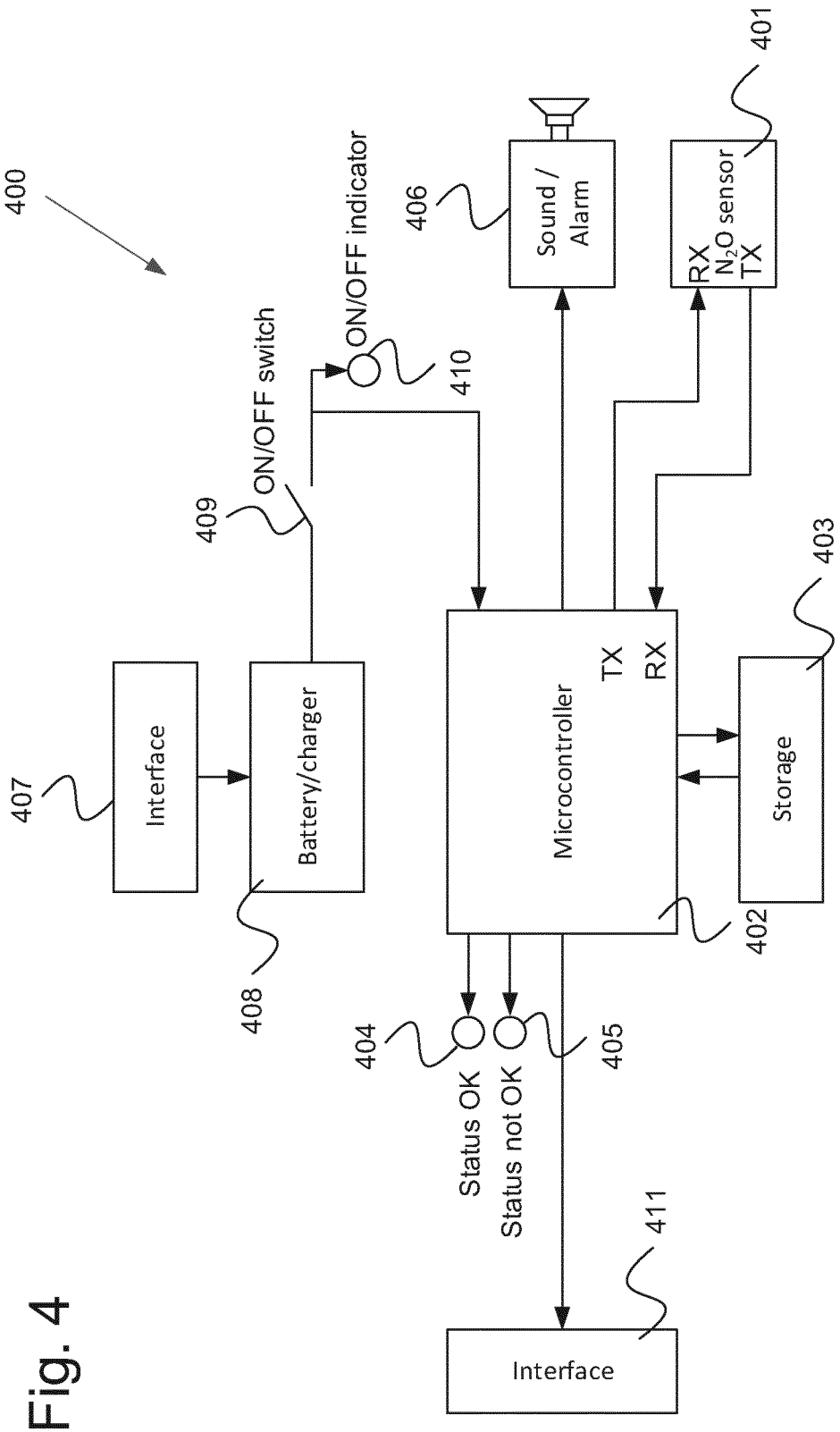
FIG. 4 illustrates an exemplary nitrous oxide detector according to embodiments of the invention.

According to embodiments of the invention the gas sensor according to the invention is integrated in a nitrous oxide gas detector. An exemplary nitrous oxide gas detector 400 according to the invention is illustrated in FIG. 4. The nitrous oxide gas detector 400 according to FIG. 4 is designed to be a portable detector e.g. intended to be carried by medical staff throughout a work shift to detect nitrous oxide presence in the environment in which the medical staff is present. The nitrous oxide detector 400 is designed to measure instant and accumulated exposure to nitrous oxide and generate a signal in case a threshold is exceeded. The nitrous oxide detector 400 comprises a nitrous oxide sensor 401 according to the above where the diffusion layer, i.e. filter according to the present example is arranged such that it is exposed to the exterior of the detector and in a manner that allows replacement of the filter when needed as was discussed above. This may be performed at regular intervals and the need for replacement of the filter may be indicated e.g. by the filter, such as by the active substance of the filter changing colour when being saturated by carbon dioxide and also by the nitrous oxide detector generating a signal after a predetermined time of use following a filter replacement. This is the case for sodium hydroxide and calcium hydroxide that turn blue from absorbing carbon dioxide.

The nitrous oxide detector also comprises a processing unit 402, such as a micro controller that communicates with the nitrous oxide sensor, i.a. in order to receive sensor signals representing the current occurrence of nitrous oxide in the ambient air. The nitrous oxide detector 400 further comprises a storage 403 for storing software, sensor measurements and accumulated exposure according to the below. The processing unit 402 may communicate status through status LED:s 404, 405, where e.g. LED 404 may indicate that everything is OK, and LED 405 may indicate e.g. a need for charging, need for replacing filter, and/or presence of a gas alarm. A single light indicator changing colour to indicate status may also be utilised. The processing unit 402 is also connected to a sound unit 406 for generating e.g. a gas alarm through sound signals. The nitrous oxide detector 400 further comprises an interface, such as e.g. a USB interface being utilised as a charging port 407, and battery and charger 408. The nitrous oxide detector 400 comprises an on/off switch 409, and on/off status indicator 410. Furthermore, the detector comprises a communication interface 411, which may be wired or wireless for communication with the nitrous oxide detector e.g. to download data, update detector etc. In case the interface 411 is a wired interface the interfaces 411 and 407 may form a joint interface.

Figure 5:
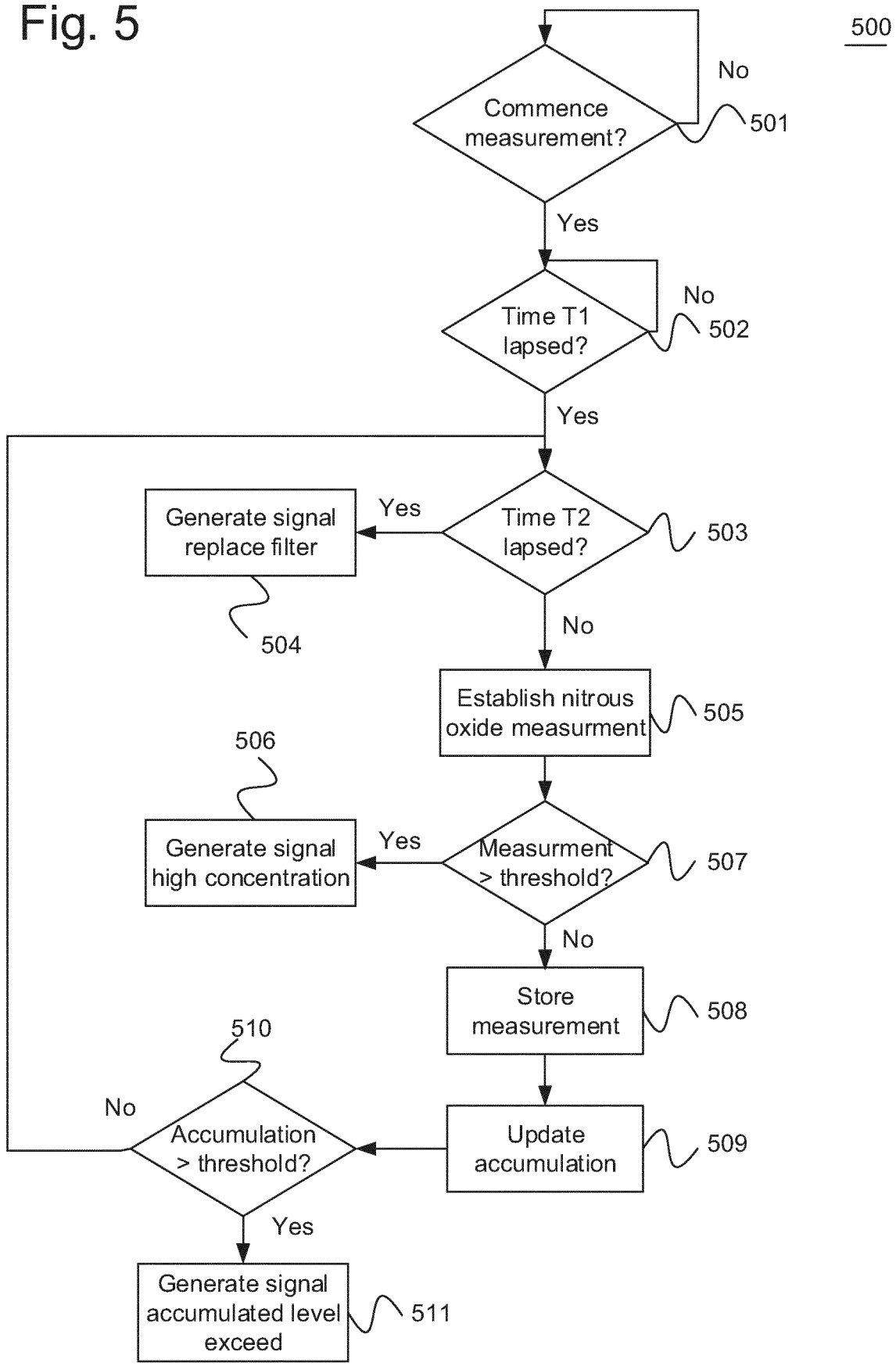
FIG. 5 illustrates an exemplary method according to embodiments of the invention.

FIG. 5 illustrates an exemplary method 500 for monitoring presence of nitrous oxide using the nitrous oxide detector 400 of FIG. 4. The method may be computer-implemented and be carried out by the processing unit 402.

The method starts in step 501, where it is determined whether monitoring of the levels of nitrous oxide is to commence. This may be triggered, for example by the nitrous oxide detector 400 being turned on using on/off switch 409. The measurement may then be arranged to be carried out continuously e.g. for as long as the detector is turned on.

In step 502 it is determined whether a first predetermined time has lapsed. Sensors of the kind according to the present invention in general requires a warm-up time in order to properly heat sensor components to thereby ensure that the sensor delivers accurate measurements. When the warm-up time has lapsed the method continues to step 503, where it is determined whether an accumulated time of use of the nitrous oxide detector 400 following a previous reset of the accumulation exceeds a second predetermined time. The method continues to step 505 for as long as this is not the case, whereas the method continues to step 504 when this is the case. The second predetermined time defines a recommended time interval after which it is deemed necessary to exchange the diffusion filter in order to ensure proper absorption of carbon dioxide.

According to embodiments of the invention it is contemplated that any diffusion layer being capable of blocking carbon dioxide while allowing passage of nitrous oxide. However, as discussed above, according to the present example, the diffusion layer comprises a filter where granules of an active substance such as e.g. sodium hydroxide or calcium hydroxide absorb carbon dioxide through a chemical reaction where the active substance simultaneously forms part of the chemical reaction. The presence of the active substance thereby decreases over time with a corresponding reduction in the capacity to absorb carbon dioxide. In case the filter is not properly absorbing carbon dioxide the carbon dioxide will instead pass through the filter and compromise the measurements such that inaccurate results are obtained.

The filter therefore needs replacement at regular intervals to properly absorb carbon dioxide. In step 504, therefore, a signal that informs the user of a need for replacing the filter is generated when it is determined that the filter has reached its service life. The method may then e.g. require a resetting of the device in order to again take it into use. The signal may be one or more from a light signal using LED 405, sound signal using sound device 406, displaying a message on a display of the detector in case such is present.

When it is determined that filter replacement presently is not necessary, the method continues to step 505, where a measurement of the current nitrous oxide level delivered by the sensor is established. This measurement value is compared with a first threshold value in step 506. This first threshold value may be a maximum limit value of nitrous oxide that indicates a current concentration in the ambient air being potentially hazardous, or potentially having an adverse effect on the working capabilities of the medical staff. When the first threshold value exceeded the method continues to step 507 where an alarm signal is generated to alert the user. This alarm signal may, e.g., consist of both light and sound and display of a message on a display if present. The alarm may be an indication that the premises are to be immediately evacuated and that a possible leakage causing the high concentrations should be searched for.

For as long as the first threshold value is not exceeded, the method continues to step 508 where the processing unit 402 stores the measurement value in storage, e.g. any suitable kind of memory such as a flash memory, 403 and in step 509 an accumulated exposure over time is updated by multiplying measurements with time that has lapsed between the measurements. In step 510 it is determined whether the accumulated exposure exceeds a second threshold. For as long as this is not the case the method returns to step 503 to again determine whether filter is to be replaced and thereafter establish a further measurement from sensor 401 for treatment according to the above. Steps 503-510 may be arranged to be performed continuously or at regular intervals such as once for every 1-100 seconds. In case the threshold is exceeded in step 510 the method continues to step 511 to generate a signal that the limit for long time exposure has been reached, signifying that the person wearing the nitrous oxide detector shall leave the current environment to avoid further exposure.

According to embodiments of the invention it is hence provided a nitrous oxide sensor and detector that allows accurate measurements of low occurrences of nitrous oxide while still allowing a sensor design utilising diffusion to thereby prevent the necessity of pumping gas through the measurement chamber so that a lightweight portable device may be obtained, and thereby allow measurement of the ambient air at the location of e.g. medical staff which oftentimes work close to patients and may thereby be subjected to levels of nitrous oxide that a stationary detector further away would not detect. It is also contemplated that the nitrous oxide detector comprises means for wireless communication, such as wifi, Bluetooth or any other suitable communication method. This allows e.g. communication with a ventilation system comprising a speed controlled fan to request forced ventilation when instant or accumulated concentrations exceed a threshold to thereby reduce the prevailing levels of nitrous oxide and possibly secure the premises from hazardous concentrations.

Finally, it is to be understood the present invention is not limited to the above-described embodiments. Instead, the present invention relates to, and encompasses all different embodiments that are included within the scope of the independent claims.

The invention claimed is:

1. A nitrous oxide detector for detecting nitrous oxide ($N_2O$) in ambient gas, comprising a gas sensor having:
   a measurement chamber for receiving the ambient gas to be measured;
   an optical source for emitting radiation in the measurement chamber;
   a radiation detector sensitive to radiation emitted by the optical source, the radiation being configured to be detected by the radiation detector following passage through the measurement chamber; and
   the radiation detector being configured to measure occurrence of nitrous oxide ($N_2O$) in the gas being measured; wherein:
   the nitrous oxide detector comprises a diffusion layer, the diffusion layer being configured to allow diffusion of ambient gas into and out from the measurement chamber, the diffusion layer comprising means for preventing diffusion of carbon dioxide ($CO_2$) in the ambient gas into the measurement chamber; and
   the nitrous oxide detector further being adapted to receive measurements of the occurrence of nitrous oxide ($N_2O$) from the gas sensor and generate a signal when the measurements of the occurrence of nitrous oxide ($N_2O$) exceed a predetermined threshold.

2. A nitrous oxide detector according to claim 1, wherein:
   the diffusion layer comprises one or more absorbents for absorbing carbon dioxide ($CO_2$) in the ambient gas passing through the diffusion layer to thereby prevent carbon dioxide ($CO_2$) in the ambient gas from entering the measurement chamber.

3. A nitrous oxide detector according to claim 1, wherein:
   the diffusion layer is designed to allow a diffusion rate of nitrous oxide ($N_2O$) being such that the concentration of nitrous oxide ($N_2O$) in the measurement chamber reflects a change in concentration of nitrous oxide ($N_2O$) in the ambient gas within a first predetermined period of time.

4. A nitrous oxide detector according to claim 3, wherein:
   the diffusion layer is designed such that a diffusion rate through the diffusion layer is dependent on the thickness of the diffusion layer.

5. A nitrous oxide detector according to claim 1, wherein:
   the diffusion layer comprises a filter.

6. A nitrous oxide detector according to claim 5, wherein:
   the filter comprises sodium hydroxide and/or calcium hydroxide as absorbents for absorbing carbon dioxide ($CO_2$) being present in the gas entering the measurement chamber.

7. A nitrous oxide detector according to claim 1, further comprising:
   receiving means for releasably receiving corresponding means of the diffusion layer, or vice versa, for releasable attachment of the diffusion layer to the sensor body so as to allow replacement of the diffusion layer.

8. A nitrous oxide detector according to claim 1, wherein:
   the processing means is configured to accumulate a presence of nitrous oxide ($N_2O$) over time, and
   the processing means is configured to generate the signal when an accumulated occurrence of nitrous oxide ($N_2O$) exceeds the predetermined threshold.

9. A nitrous oxide detector according to claim 1, the diffusion layer comprising at least one absorbent being consumed by absorbing carbon dioxide ($CO_2$) and requiring regular replacement, the nitrous oxide ($N_2O$) detector being further adapted to indicate when the diffusion layer needs to be replaced.

10. A nitrous oxide detector according to claim 1, wherein the nitrous oxide detector is designed to be carried by medical staff throughout the workday while carrying out regular work.

11. A nitrous oxide detector according to claim 1, wherein the measurement chamber is designed such that the optical pathway between the optical source and the radiation detector exceeds the possible optical pathway between the optical source and the radiation detector when arranged within direct line of sight of each other within the measurement chamber so as to allow a reduction in size of the nitrous oxide detector while still providing a minimum desired optical pathway in the measurement chamber.

12. A method for determining an occurrence of nitrous oxide ($N_2O$) in ambient gas using a nitrous oxide detector comprising a gas sensor, the gas sensor comprising:

a measurement chamber for receiving the ambient gas to be measured;

an optical source for emitting radiation in the measurement chamber; and a detector sensitive to radiation emitted by the optical source, the radiation being detected following passage through the measurement chamber, and the radiation detector being configured to measure occurrence of nitrous oxide ($N_2O$) in the gas being measured;

wherein the nitrous oxide detector further comprises a diffusion layer, the diffusion layer being configured to allow diffusion of nitrous oxide ($N_2O$) into and out from the measurement chamber, and to prevent diffusion of carbon dioxide ($CO_2$) in the ambient gas into the measurement chamber, the method comprising the steps of:

receiving measurements of the occurrence of nitrous oxide ($N_2O$) from the gas sensor; and generating a signal when the measurements of the occurrence of nitrous oxide ($N_2O$) exceed a predetermined threshold.

13. Computer-readable non-transitory medium comprising instructions which, when executed by a computer, cause the computer to carry out the method according to claim 12.

* * * * *